(12) United States Patent
Waggoner et al.

(10) Patent No.: US 11,473,474 B2
(45) Date of Patent: Oct. 18, 2022

(54) METHOD OF INJECTING SECONDARY AIR INTO AN EXHAUST GAS STREAM OF A MARINE ENGINE

(71) Applicant: Indmar Products Company, Inc., Millington, TN (US)

(72) Inventors: Richard J. Waggoner, Punta Gorda, FL (US); Jason C. Stimmel, Eads, TN (US); Jason Vetzel, Eustis, FL (US); Derrick W. Lloyd, Germantown, TN (US); Timothy G. Anderson, Munford, TN (US)

(73) Assignee: Indmar Products Company, Inc., Millington, TN (US)

( * ) Notice: Subject to any disclaimer, the term of this patent is extended or adjusted under 35 U.S.C. 154(b) by 11 days.

(21) Appl. No.: 17/389,689

(22) Filed: Jul. 30, 2021

(65) Prior Publication Data

US 2021/0355853 A1    Nov. 18, 2021

Related U.S. Application Data

(63) Continuation of application No. 16/744,372, filed on Jan. 16, 2020, now Pat. No. 11,111,838.

(Continued)

(51) Int. Cl.
*F01N 3/32* (2006.01)
*F01N 3/22* (2006.01)
(Continued)

(52) U.S. Cl.
CPC ............... *F01N 3/32* (2013.01); *F01D 25/14* (2013.01); *F01N 3/05* (2013.01); *F01N 3/20* (2013.01);
(Continued)

(58) Field of Classification Search
CPC . F02B 37/168; F01N 1/14; F01N 3/05; F01N 3/22–227; F01N 3/30–34; F01N 2270/00–10; F01N 2550/14
(Continued)

(56) References Cited

U.S. PATENT DOCUMENTS 5,140,810 A    8/1992  Kuroda
6,276,139 B1   8/2001  Moraal et al.
(Continued)

FOREIGN PATENT DOCUMENTS

DE    102004052062 A1   4/2006
JP    2004324454 A      11/2004
JP    2006307722 A      11/2006

*Primary Examiner* — Mickey H France
(74) *Attorney, Agent, or Firm* — Wood Herron & Evans LLP (57) ABSTRACT

An air intake and exhaust system for a marine engine having an intake manifold and an exhaust manifold includes an air compressor configured to compress ambient air into compressed air and a catalytic converter assembly configured to convert pollutants in an exhaust gas stream received from the exhaust manifold. The air compressor is configured to be fluidly coupled to the intake manifold of the engine for directing at least a first portion of the compressed air to the intake manifold of the engine. The air compressor is also selectively fluidly coupled to the catalytic converter assembly for selectively directing a second portion of the compressed air into the exhaust gas stream at a secondary air injection location at or upstream of the catalytic converter assembly.

20 Claims, 7 Drawing Sheets

Related U.S. Application Data (60) Provisional application No. 62/804,790, filed on Feb. 13, 2019.

(51) Int. Cl.
| | | |
|---|---|---|
| *F02B 37/16* | (2006.01) | |
| *F01D 25/14* | (2006.01) | |
| *F02C 7/24* | (2006.01) | |
| *F01N 3/20* | (2006.01) | |
| *F01N 3/30* | (2006.01) | |
| *F01N 3/05* | (2006.01) | |
| *F01N 11/00* | (2006.01) | |

(52) U.S. Cl.
CPC ............... *F01N 3/222* (2013.01); *F01N 3/30* (2013.01); *F01N 11/007* (2013.01); *F02B 37/168* (2013.01); *F02C 7/24* (2013.01); *F01N 3/323* (2013.01); *F01N 2560/025* (2013.01); *F01N 2590/021* (2013.01); *F05D 2220/40* (2013.01); *F05D 2260/231* (2013.01); *Y02T 10/12* (2013.01)

(58) Field of Classification Search
USPC .................................. 60/289, 293, 307, 308
See application file for complete search history.

(56) References Cited

U.S. PATENT DOCUMENTS

| | | | |
|---|---|---|---|
| 10,364,012 | B2 | 7/2019 | Kimball et al. |
| 10,415,444 | B2 | 9/2019 | Stimmel et al. |
| 10,464,652 | B2 | 11/2019 | Anderson et al. |
| 2002/0083700 | A1 | 7/2002 | Ellmer et al. |
| 2005/0109029 | A1 | 5/2005 | Busch |
| 2009/0183499 | A1 | 7/2009 | Boorse |
| 2012/0117962 | A1 | 5/2012 | VanDyne et al. |
| 2013/0340430 | A1 | 12/2013 | Peters et al. |
| 2014/0020367 | A1* | 1/2014 | Kim ...................... F02B 37/168 60/277 |
| 2014/0060009 | A1 | 3/2014 | Zhang et al. |
| 2015/0013311 | A1 | 1/2015 | Horst et al. |
| 2016/0369687 | A1 | 12/2016 | Martin et al. |
| 2017/0218890 | A1 | 8/2017 | Mathebula |
| 2018/0283255 | A1 | 10/2018 | Schmale |

* cited by examiner

METHOD OF INJECTING SECONDARY AIR INTO AN EXHAUST GAS STREAM OF A MARINE ENGINE

CROSS REFERENCE TO RELATED APPLICATIONS

This application is a Continuation of U.S. patent application Ser. No. 16/744,372 filed Jan. 16, 2020 (pending), which claims the benefit of priority to U.S. Provisional Patent Application Ser. No. 62/804,790 filed Feb. 13, 2019, the disclosures of which are fully incorporated by reference herein.

TECHNICAL FIELD

The present invention relates generally to exhaust systems for marine engines and, more particularly, to exhaust systems having secondary air injection into the exhaust stream at or upstream of a catalytic converter.

BACKGROUND

Exhaust systems for marine engines generally include an exhaust manifold connected to the engine at each row (or "bank") of engine cylinders, and a corresponding exhaust conduit coupled to the exhaust manifold for directing exhaust gases from the manifold to an exhaust outlet, such as a tailpipe of the marine craft. In conventional exhaust systems, the exhaust conduit includes a catalytic converter assembly having a catalyst such as a catalyst brick that removes harmful emissions from the exhaust gases before being expelled through the exhaust outlet.

A three-way catalytic converter reduces nitrogen oxides to nitrogen, oxidizes carbon monoxide to carbon dioxide, and oxidizes unburnt hydrocarbons to carbon dioxide and water. In order for the chemical reaction to occur to convert carbon monoxide, oxygen must be present. However, there is typically insufficient oxygen present in the exhaust stream for the chemical reaction to occur without introducing auxiliary air.

Thus, some exhaust systems utilize a vehicle emissions control strategy known as secondary air injection, wherein fresh air is injected into the exhaust stream at or upstream of the catalytic converter to assist with catalysis of carbon monoxide. The fresh air is supplied to the catalytic converter by an auxiliary air system including a dedicated air pump, such as an electric or belt driven air pump. While such an auxiliary air system may be reasonably effective for its intended purpose, it undesirably increases the cost, weight, and size of the overall exhaust system. In some cases, these adverse effects may be prohibitive, and secondary air injection is thus not utilized in many exhaust systems. As a consequence, many exhaust systems fail to adequately catalyze carbon monoxide.

Accordingly, there is a need for improvements to known marine engine exhaust systems to address these and other shortcomings.

SUMMARY

According to an exemplary embodiment of the invention, an air intake and exhaust system for a marine engine having an intake manifold and an exhaust manifold is provided. The system includes an air compressor configured to compress ambient air into compressed air and a catalytic converter assembly configured to convert pollutants in an exhaust gas stream received from the exhaust manifold of the engine. The air compressor is configured to be fluidly coupled to the intake manifold of the engine for directing at least a first portion of the compressed air to the intake manifold of the engine, and the air compressor is selectively fluidly coupled to the catalytic converter assembly for selectively directing a second portion of the compressed air into the exhaust gas stream at a secondary air injection location at or upstream from the catalytic converter assembly. In one embodiment, the air intake and exhaust system further includes a turbine configured to extract energy from the exhaust stream and operatively coupled to the air compressor to transfer the extracted energy to the ambient air for compressing the ambient air into compressed air. In addition, or alternatively, the air intake and exhaust system may further include an intercooler fluidly coupled to the air compressor and configured to increase the density of the compressed air.

In one embodiment, the air intake and exhaust system includes a valve positioned between the air compressor and the catalytic converter assembly. The valve is movable between at least one open position and a closed position, and the air compressor is in fluid communication with the catalytic converter assembly when the valve is in the at least one open position. The air intake and exhaust system may also include a controller in operative communication with the valve for sending at least one signal to the valve to move to the at least one open position or to the closed position. The air intake and exhaust system may further include an oxygen sensor in operative communication with the controller and configured to detect an oxygen level of the exhaust gas stream upstream from the secondary air injection location. For example, the controller may be configured to send the at least one signal to the valve in response to the detected oxygen level. In one embodiment, the at least one open position includes a plurality of open positions. In addition, or alternatively, the catalytic converter assembly may include a catalyst element. In another embodiment, a marine craft includes the air intake and exhaust system.

According to another exemplary embodiment of the invention, an assembly for a marine craft includes a marine engine having an intake manifold and an exhaust manifold. The assembly also includes an air compressor configured to compress ambient air into compressed air and a catalytic converter assembly configured to convert pollutants in an exhaust gas stream received from the exhaust manifold of the engine. The air compressor is fluidly coupled to the intake manifold of the engine for directing at least a first portion of the compressed air to the intake manifold of the engine, and the air compressor is selectively fluidly coupled to the catalytic converter assembly for selectively directing a second portion of the compressed air into the exhaust gas stream at a secondary air injection location at or upstream from the catalytic converter assembly.

The assembly may further include a turbine configured to extract energy from the exhaust stream and operatively coupled to the air compressor to transfer the extracted energy to the ambient air for compressing the ambient air into compressed air. In addition, or alternatively, the assembly may also include a valve positioned between the air compressor and the catalytic converter assembly, wherein the valve is movable between at least one open position and a closed position, and wherein the air compressor is in fluid communication with the catalytic converter assembly when the valve is in the at least one open position. The assembly may further include a controller in operative communication with the valve for sending at least one signal to the valve to move to the at least one open position or to the closed position. For example, the controller may be in operative communication with one or more components of the engine. The assembly may also include an oxygen sensor in operative communication with the controller and configured to detect an oxygen level of the exhaust gas stream upstream from the secondary air injection location.

According to yet another exemplary embodiment of the invention, a method of injecting secondary air into an exhaust gas stream of a marine engine is provided. The method includes compressing ambient air into compressed air, directing a first portion of the compressed air to an intake manifold of the engine, directing a second portion of the compressed air into the exhaust gas stream to form a mixture, and directing the mixture into a catalytic converter assembly. Compressing ambient air into compressed air may include transferring energy from the exhaust gas stream to the ambient air. The method may further include detecting an oxygen level in the exhaust gas stream, wherein directing a second portion of the compressed air into the exhaust gas stream is performed in response to the detected oxygen level. In addition, or alternatively, the method may also include directing the first and second portions of the compressed air through an intercooler.

Various additional features and advantages of the invention will become more apparent to those of ordinary skill in the art upon review of the following detailed description of the illustrative embodiments taken in conjunction with the accompanying drawings.

BRIEF DESCRIPTION OF THE DRAWINGS

The drawings, which are incorporated in and constitute a part of this specification, illustrate embodiments of the invention and, together with the general description given above and the detailed description given below, explain the embodiments of the invention.

DETAILED DESCRIPTION

Figure 1:
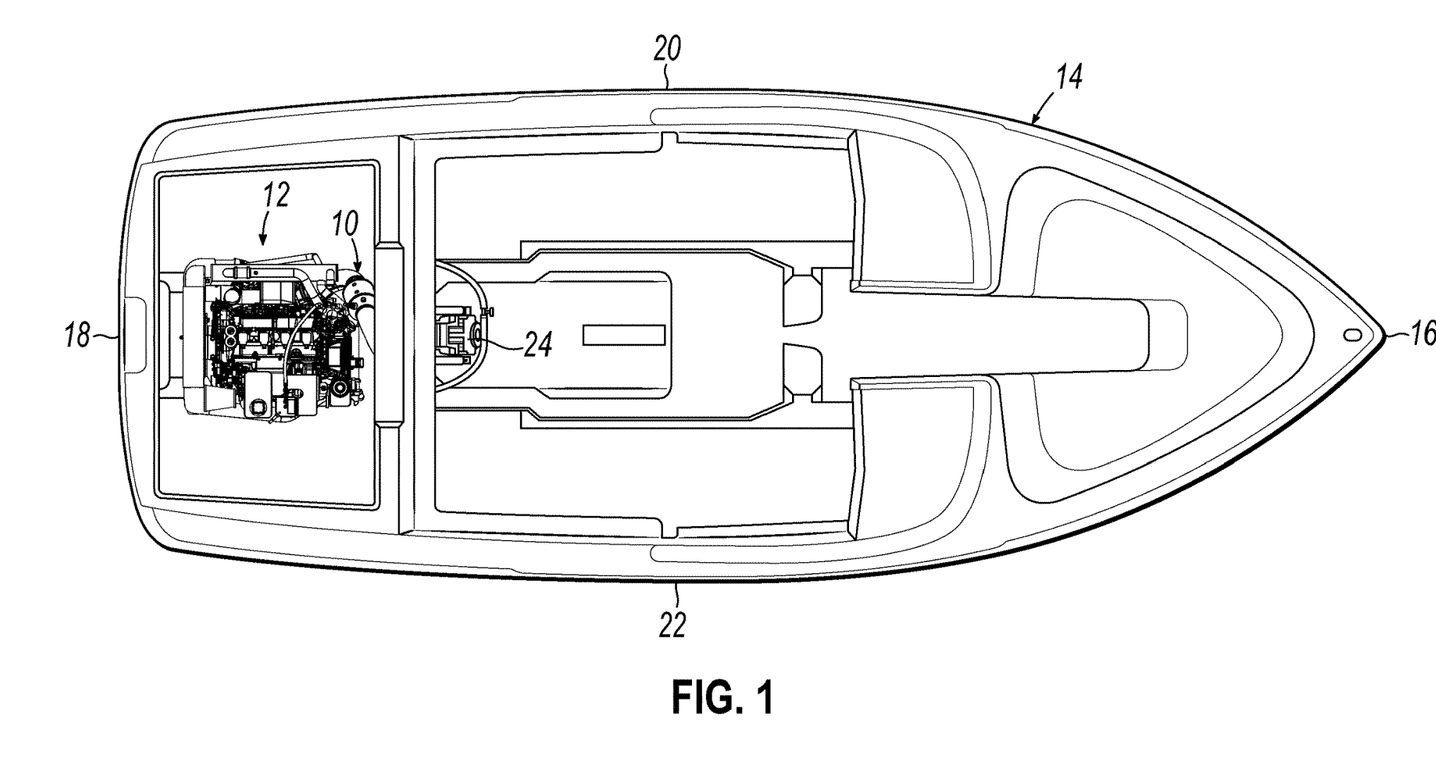
FIG. 1 is a top view of a motorboat including an inboard engine and an air intake and exhaust system coupled to the engine, in accordance with an exemplary aspect of the invention.

Referring now to FIG. 1, an exemplary air intake and exhaust system 10 according to an aspect of the invention is shown mounted to a forced induction or "boosted" marine engine 12 within a marine craft such as a motorboat 14. The motorboat 14 includes a bow 16, a stern 18, a port side 20, and a starboard side 22. The engine 12 is shown mounted in an "inboard" configuration and is coupled to a V-drive transmission 24 that drives a propeller shaft and propeller (not shown) to rotate, which propels the motorboat 14 through the water. The illustrated forced induction engine 12 is equipped with a turbocharger 30 including a radial turbine 32 including a rotor 34 and an air compressor such as a centrifugal compressor 36 including an impeller 38 (FIGS. 2-4) for increasing the efficiency and power output of the engine 12. As described in greater detail below, an onboard controller 40 (FIGS. 3 and 4) such as an engine control module (ECM) or engine control unit (ECU) may be in operative communication with various components of the engine 12 and/or air intake and exhaust system 10 to promote optimal performance of the engine 12, for example.

Figure 2:
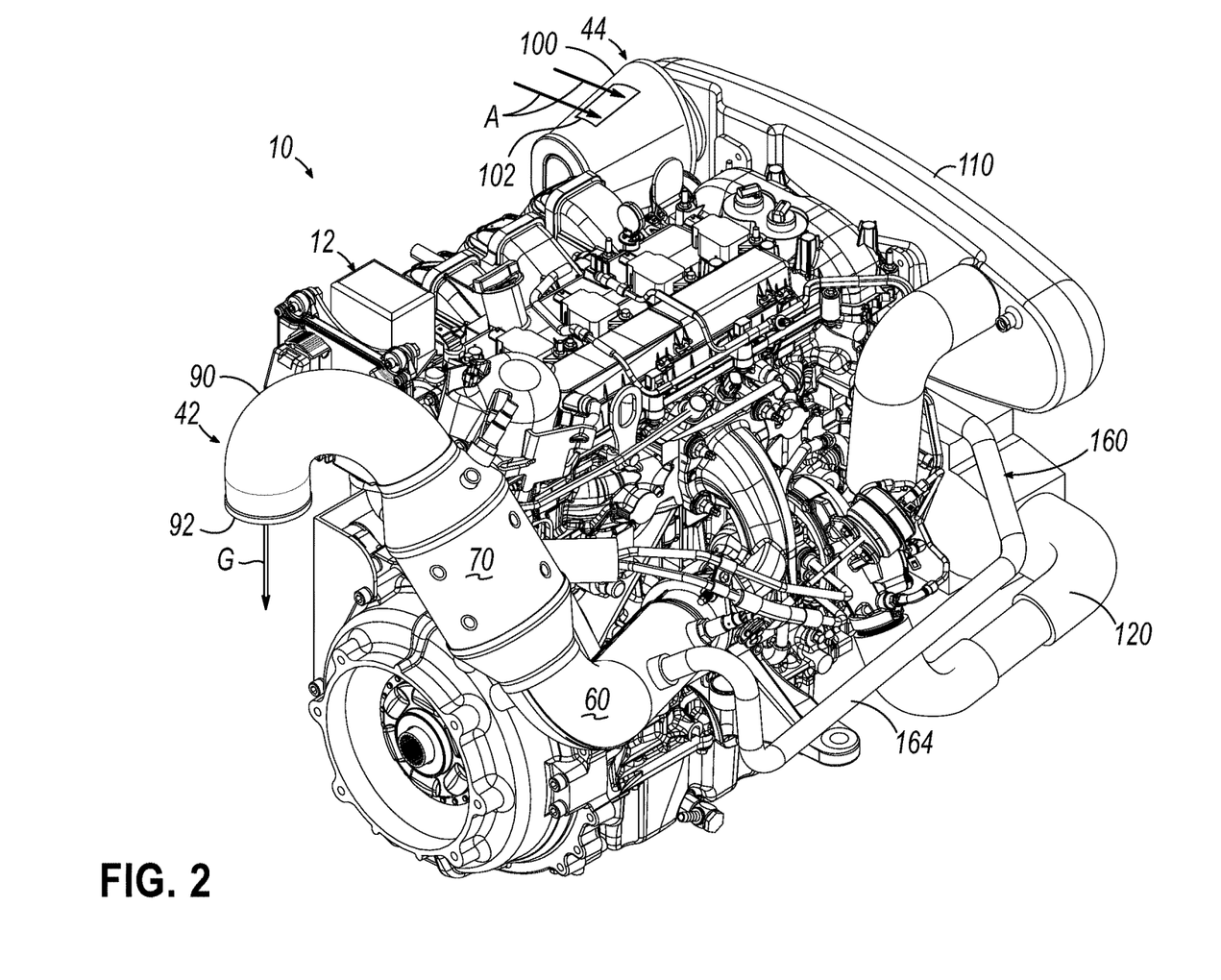
FIG. 2 is a front perspective view of the air intake and exhaust system of FIG. 1, showing the engine and various other components associated with the engine.
Figure 3:
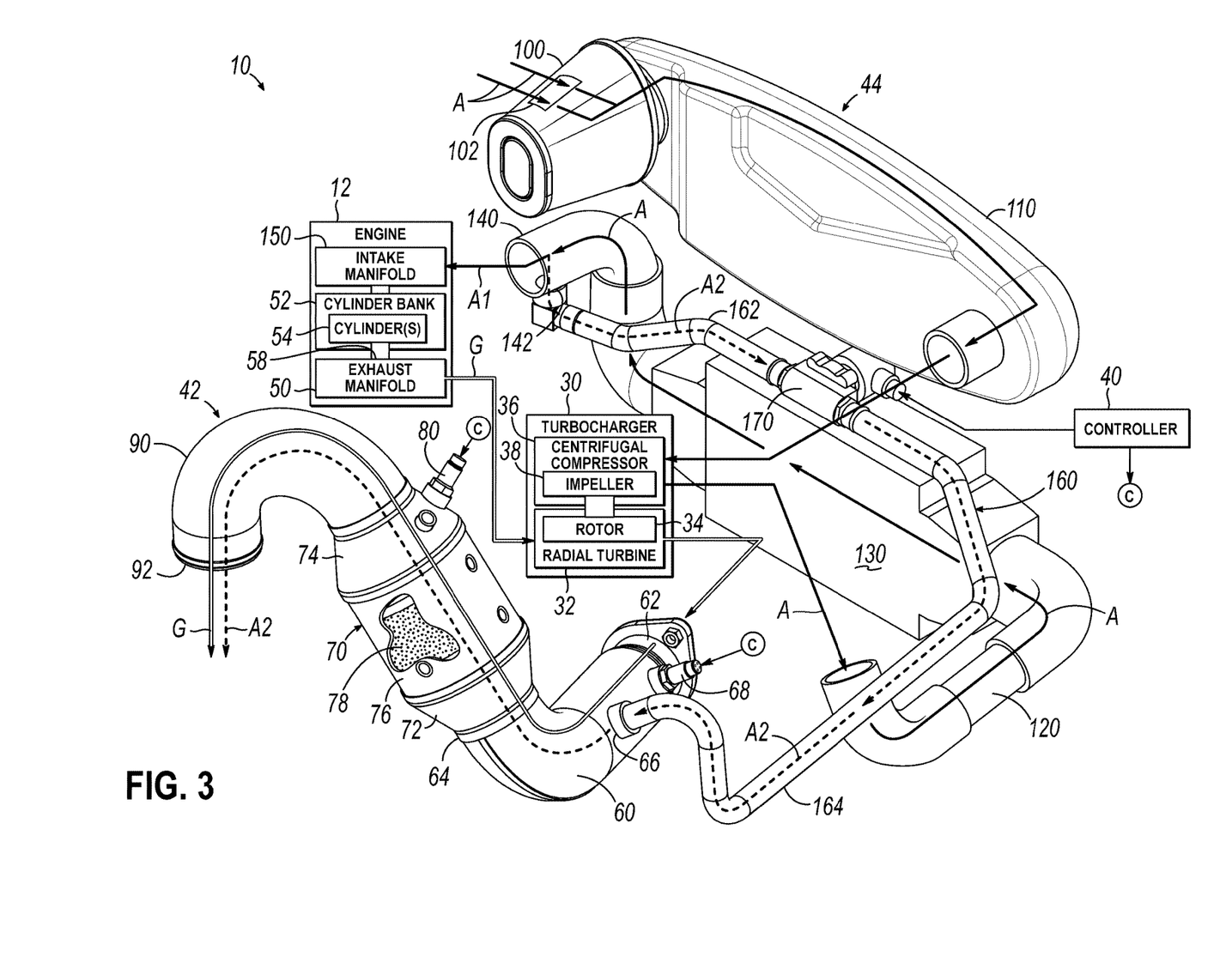
FIG. 3 is a front schematic view of the air intake and exhaust system of FIG. 2 with various components associated with the engine hidden from view, and showing the flow paths of intake air and engine exhaust.
Figure 4:
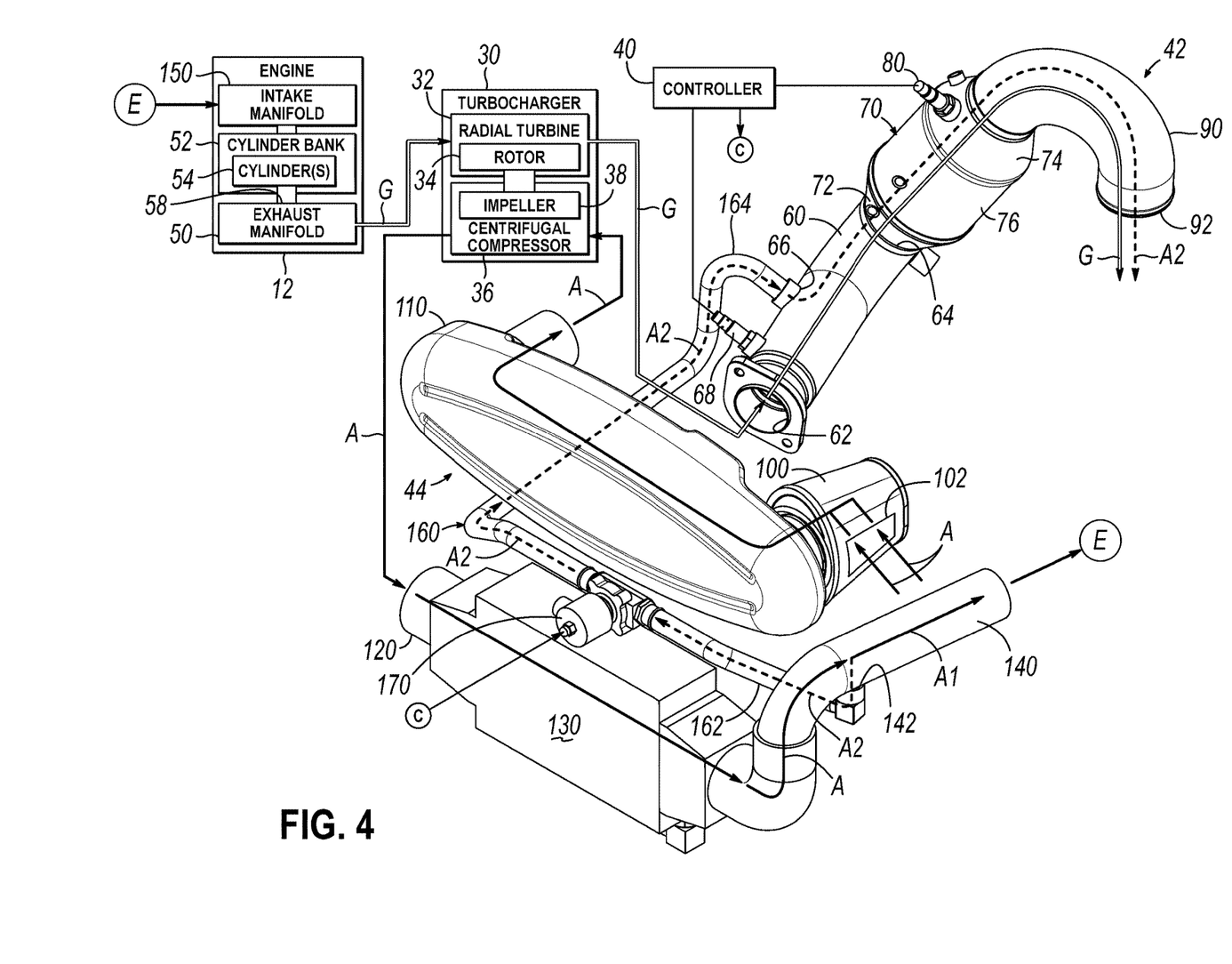
FIG. 4 is a rear schematic view of the air intake and exhaust system of FIG. 2 with various components associated with the engine hidden from view, and showing the flow paths of intake air and engine exhaust.

Referring now to FIGS. 2-4, the exemplary air intake and exhaust system 10 is shown in greater detail, with various components associated with the engine 12 being hidden from view in FIGS. 3 and 4. In the embodiment shown, the air intake and exhaust system 10 includes an exhaust subsystem 42 and an air intake subsystem 44.

The exhaust subsystem 42 generally includes at least one exhaust manifold 50 that couples to at least one bank 52 of cylinders 54 of the engine 12, such as via threaded bolts (not shown). The engine 12 may be in the form of a "V-8" engine, having two banks 52 of four cylinders 54 arranged in a known V-configuration. As such, the at least one exhaust manifold 50 may include a corresponding number of exhaust inlet ports 58, each aligned in fluid communication with and receiving hot exhaust gases G expelled from a respective cylinder 54 of the engine 12. In alternative embodiments, the at least one exhaust manifold 50, as well as other components of the exemplary exhaust and air intake subsystems 42, 44 disclosed herein, may be modified as desired to accommodate marine engines having various alternative quantities and configurations of cylinders, for example.

The illustrated exhaust subsystem 42 further includes the turbine 32 of the turbocharger 30. More particularly, the turbine 32 is positioned downstream of and in fluid communication with the exhaust manifold 50 for receiving exhaust gases G expelled therefrom. The turbine 32 is configured to extract energy from the flow of exhaust gases G which may then be transferred to the compressor 36. For example, the rotor 34 may be rotatably mounted within the turbine 32 so as to be driven by the exhaust gases G passing therethrough. The rotor 34 of the turbine 32 is operatively coupled to the impeller 38 of the compressor 36 which may be rotatably mounted within the compressor 36 such that rotation of the rotor 34 may cause a corresponding rotation of the impeller 38. In this manner, the turbine 32 may extract energy from the exhaust gases G and the compressor 36 may transfer the extracted energy to fresh air A within the compressor 36, as described in greater detail below.

The turbocharger 30 may include a wastegate (not shown) for selectively diverting a portion of the exhaust gases G away from the rotor 34 to regulate a rotational speed of the rotor 34 and thus a rotational speed of the impeller 38, such as to reduce the amount of pressure generated within the compressor 36. In one embodiment, the wastegate may be in operative communication with the controller 40.

An exhaust conduit 60 is positioned downstream of and in fluid communication with the turbine 32 for receiving exhaust gases G expelled therefrom. The exhaust conduit 60 includes an exhaust inlet 62 positioned proximate to the turbine 32 and an exhaust outlet 64 positioned distal from the turbine 32. The exhaust conduit 60 also includes a secondary air inlet 66 positioned between the exhaust inlet and outlet 62, 64, the purpose of which is described below, and a first oxygen sensor 68 positioned between the exhaust inlet 62 and the secondary air inlet 66 such that the first oxygen sensor 68 may be capable of detecting an oxygen level in the exhaust gases G expelled from the turbine 32.

The first oxygen sensor 68 may be in operative communication with the controller 40 such that the first oxygen sensor 68 may be capable of sending a signal to the controller 40 containing information regarding the detected oxygen level. Communication between the first oxygen sensor 68 and the controller 40 may be performed via wires directly connecting the first oxygen sensor 68 to the controller 40, or alternatively via a wireless network, for example.

In response to receiving one or more signals from the first oxygen sensor 68, the controller 40 may be configured to determine whether the engine 12 is operating in a stoichiometric mode, a fuel-enriched mode (e.g., with a relative increase in fuel or decrease in oxygen), or a fuel-lean mode (e.g., with a relative increase in oxygen or decrease in fuel). More specifically, the controller 40 may be configured to compare each of the one or more detected oxygen levels to one or more pre-determined threshold values, and then take additional pre-determined action as appropriate. For example, the controller 40 may be configured to adjust an amount of fuel injected into the engine 12 if the engine 12 is not operating in a stoichiometric mode.

A catalytic converter assembly 70 is positioned downstream of and in fluid communication with the exhaust conduit 60 for receiving at least exhaust gases G expelled therefrom. The catalytic converter assembly 70 includes inlet and outlet cone portions 72, 74 that taper from an intermediate portion 76 having an enlarged diameter for accommodating a catalyst brick or element 78 housed therein. The catalyst element 78 is configured to remove toxic pollutants from the exhaust gases G. A second oxygen sensor 80 is positioned downstream of the catalyst element 78 such that the second oxygen sensor 80 may be capable of detecting an oxygen level in at least the exhaust gases G expelled from the catalyst element 78.

The second oxygen sensor 80 may be in operative communication with the controller 40 such that the second oxygen sensor 80 may be capable of sending a signal to the controller 40 containing information regarding the detected oxygen level. Communication between the second oxygen sensor 80 and the controller 40 may be performed via wires directly connecting the second oxygen sensor 80 to the controller 40, or alternatively via a wireless network, for example.

In response to receiving one or more signals from the second oxygen sensor 80, the controller 40 may be configured to determine whether the catalyst element 78 is effectively and/or efficiently removing toxic pollutants from the exhaust gases G. More specifically, the controller 40 may be configured to compare each of the one or more oxygen levels detected by the second oxygen sensor 80 to one or more pre-determined threshold values and/or to the one or more oxygen levels detected by the first oxygen sensor 68, and then take additional pre-determined action as appropriate. For example, the controller 40 may be configured to communicate a warning to an operator of the motorboat 14 if performance of the catalyst element 78 is below a threshold level.

The exhaust subsystem 42 also includes a tailpipe 90 positioned downstream of and in fluid communication with the catalytic converter assembly 70 for receiving at least the exhaust gases G expelled therefrom. The tailpipe 90 includes an exhaust subsystem outlet 92 for directing at least the exhaust gases G out of the exhaust subsystem 42 to an external environment.

The air intake subsystem 44 generally includes an air intake 100 having at least one air intake subsystem inlet 102 for receiving fresh ambient air A from the external environment to be primarily directed to the engine 12 for combustion purposes, for example. The air intake 100 may be equipped with an air filter, flame arrestor, and/or other suitable components (not shown). An air intake duct 110 is positioned downstream of and in fluid communication with the air intake 100 for receiving the fresh ambient air A therefrom.

The illustrated air intake subsystem 44 further includes the compressor 36 of the turbocharger 30. More particularly, the compressor 36 is positioned downstream of and in fluid communication with the air intake duct 110 for receiving the fresh ambient air A therefrom. The compressor 36 of the turbocharger 30 is configured to transfer energy extracted from the flow of exhaust gases G by the turbine 32, for example, to the ambient air A. In this regard, the impeller 38 rotatably mounted within the compressor 36 may be configured to compress the air A via rotation of the impeller 38 corresponding to rotation of the rotor 34 of the turbine 32 caused by the exhaust gases G passing through the turbine 32.

A compressor outlet conduit 120 is positioned downstream of and in fluid communication with the compressor 36 for directing compressed air A therefrom to an intercooler 130 positioned downstream of and in fluid communication with the compressor outlet conduit 120. The intercooler 130 may be configured to increase the density of the compressed air A, such as by pressure cooling the compressed air A, for example. An intercooler outlet conduit 140 is positioned downstream of and in fluid communication with the intercooler 130 for directing at least a portion of the compressed air A to an intake manifold 150 of the engine 12. The interface between the intercooler outlet conduit 140 and the intake manifold 150 may define a primary air injection location into the engine 12. Thus, the compressor 36 of the turbocharger 30 is fluidly coupled to the intake manifold 150 of the engine 12 for directing at least a first portion of the compressed air A1 to the intake manifold 150 of the engine 12 to provide forced induction to the engine 12 such that the engine 12 may be "boosted."

As shown, the intercooler outlet conduit 140 includes a secondary air outlet 142, and a secondary air injection conduit 160 extends from the secondary air outlet 142 to the secondary air inlet 66 of the exhaust conduit 60 and thus bypasses the engine 12 entirely. The illustrated secondary air injection conduit 160 is bifurcated into an upstream portion 162 and a downstream portion 164 by a valve 170 positioned in-line with the secondary air injection conduit 160. As shown, the upstream portion 162 is in fluid communication with the intercooler outlet conduit 140 via the secondary air outlet 142 and the downstream portion 164 is in fluid communication with the exhaust conduit 60 via the secondary air inlet 66.

The valve 170 may have a closed position and at least one open position for selectively placing the upstream and downstream portions 162, 164, and thus the intercooler outlet conduit 140 and exhaust conduit 60, in fluid communication with each other such that a second portion of the compressed air A2 may be directed from the intercooler outlet conduit 140 to the exhaust conduit 60 when the valve 170 is in the open position. In this regard, the discharge pressure of the compressor 36 of the turbocharger 30 may be greater than the backpressure of the exhaust stream G to prevent the exhaust stream G from inadvertently traveling through the secondary air injection conduit 160. Thus, the secondary air inlet 66 may define a secondary air injection location into the exhaust stream G. In one embodiment, the valve 170 may have only a single open position defining a single fluid constriction such that fluid flow through the valve 170 is either off or on. Alternatively, the valve 170 may have a plurality of open positions defining a plurality of fluid constrictions of varying sizes such that fluid flow through the valve 170 may be either off or adjustably on.

The valve 170 may be in operative communication with the controller 40 such that the valve 170 may be capable of receiving a signal from the controller 40 to move to the at least one open position or to the closed position. Communication between the valve 170 and the controller 40 may be performed via wires directly connecting the valve 170 to the controller 40, or alternatively via a wireless network, for example.

As described above, the controller 40 may be configured to determine whether the engine 12 is operating in a fuel-enriched mode with a relative reduction of oxygen in the exhaust stream G, such as during high speed propulsion of the motorboat 14 and/or high load of the engine 12 (e.g., with the engine 12 operating at greater than or equal to 4,000 RPM), and may take additional pre-determined action as appropriate. For example, the controller 40 may be configured to send a signal to the valve 170 to move the valve 170 to the at least one open position to direct a second portion of the compressed air A2 from the intercooler outlet conduit 140 to the exhaust conduit 60 if the engine 12 is operating in a fuel-enriched mode. Likewise, the controller 40 may be configured to send a signal to the valve 170 to move the valve 170 to the closed position to prevent compressed air A from entering into the exhaust conduit 60 if the engine 12 is operating in a fuel-lean mode. In embodiments where the valve 170 has a plurality of open positions, the controller 40 may be configured to send a plurality of signals to the valve 170 to move the valve 170 between the various open positions in order to continuously fine-tune the amount of compressed air A2 flowing through the downstream portion 164 of the secondary air injection conduit 160 and into the exhaust conduit 60. In one embodiment, the controller 40 may send one or more signals to the valve 170 to move the valve 170 to a closed position and/or at least one open position in response to one or more signals received from the first and/or second oxygen sensors 68, 80.

In this manner, the compressor 36 of the turbocharger 30 may be selectively fluidly coupled to the catalytic converter assembly 70 for selectively directing a second portion of the compressed air A2 into the exhaust gas stream G at or upstream from the catalytic converter assembly 70 for assisting in catalysis.

As shown by directional arrows G in FIGS. 3 and 4, exhaust gases G are expelled from the engine 12 via the exhaust manifold 50. The exhaust manifold 50 combines the incoming exhaust gases G into a stream, and directs the stream into the turbine 32 of the turbocharger 30. The exhaust gases G may cause the rotor 34 of the turbine 32 to rotate, which in turn causes the impeller 38 of the compressor 36 to rotate, thereby compressing the air A within the compressor 36. After exiting the turbine 32, the exhaust gases G are directed via the exhaust conduit 60 toward the catalytic converter assembly 70. Prior to entering the catalytic converter assembly 70 and upstream of the secondary air inlet 66, the exhaust gases G are directed past the first oxygen sensor 68 which detects an oxygen level in the exhaust gases G and communicates the detected oxygen level to the controller 40. The exhaust gases G subsequently enter the catalytic converter assembly 70, which reduces toxic pollutants in the exhaust gases G. Upon exiting the upper end of the catalytic converter assembly 70, the stream of exhaust gases G is directed out of the exhaust subsystem 42 to the external environment via the tailpipe 90.

As shown by directional arrows A in FIGS. 3 and 4, ambient intake air A is received from the external environment by the air intake 100 which may also filter the air A, for example. The air A is directed from the air intake 100 via the air intake duct 110 into the compressor 36 of the turbocharger 30 where the air A is compressed by rotation of the impeller 38 corresponding to the rotation of the rotor 34 caused by the flow of exhaust gases G through the turbine 32. After exiting the compressor 36, the compressed air A is directed via the compressor outlet conduit 120 through the intercooler 130, which increases the density of the compressed air A. After exiting the intercooler 130, at least a first portion of the compressed air A1 is directed via the intercooler outlet conduit 140 to the intake manifold 150 of the engine 12 for combustion purposes. When the valve 170 is in the closed position, the first portion of the compressed air A1 may include substantially all of the compressed air A expelled from the intercooler 130. When the valve 170 is in the at least one open position, a second portion of the compressed air A2 is directed via the secondary air injection conduit 160 to the exhaust conduit 60 at the secondary air inlet 66 at or upstream of the catalytic converter assembly 70 and downstream of the first oxygen sensor 68 to avoid interfering with the detection of the oxygen level in the exhaust gases G by the first oxygen sensor 68. The second portion of the compressed air A2 is directed with the exhaust gases G via the exhaust conduit 60 through the catalytic converter assembly 70, where the compressed air A2 assists in reducing toxic pollutants in the exhaust gases G. Upon exiting the upper end of the catalytic converter assembly 70, the compressed air A2 is directed with the stream of exhaust gases G out of the exhaust subsystem 42 to the external environment via the tailpipe 90. While the exhaust gases G and compressed air A2 are illustrated as having discrete flow paths through the catalytic converter assembly 70, it will be appreciated that the exhaust gases G and compressed air A2 may form a mixture which is directed through the catalytic converter assembly 70 and which undergoes additional chemical changes therein.

Thus, the compressor 36 of the turbocharger 30 may supply the second portion of fresh air A2 to the catalytic converter assembly 70 from the compressor 36 of the turbocharger 30, thereby eliminating the need for an auxiliary air system and dedicated air pump, which may provide reductions in cost, weight, and/or size of the air intake and exhaust system 10 (and, consequently, the of the motorboat 14) as compared to prior art systems.

Figure 5:
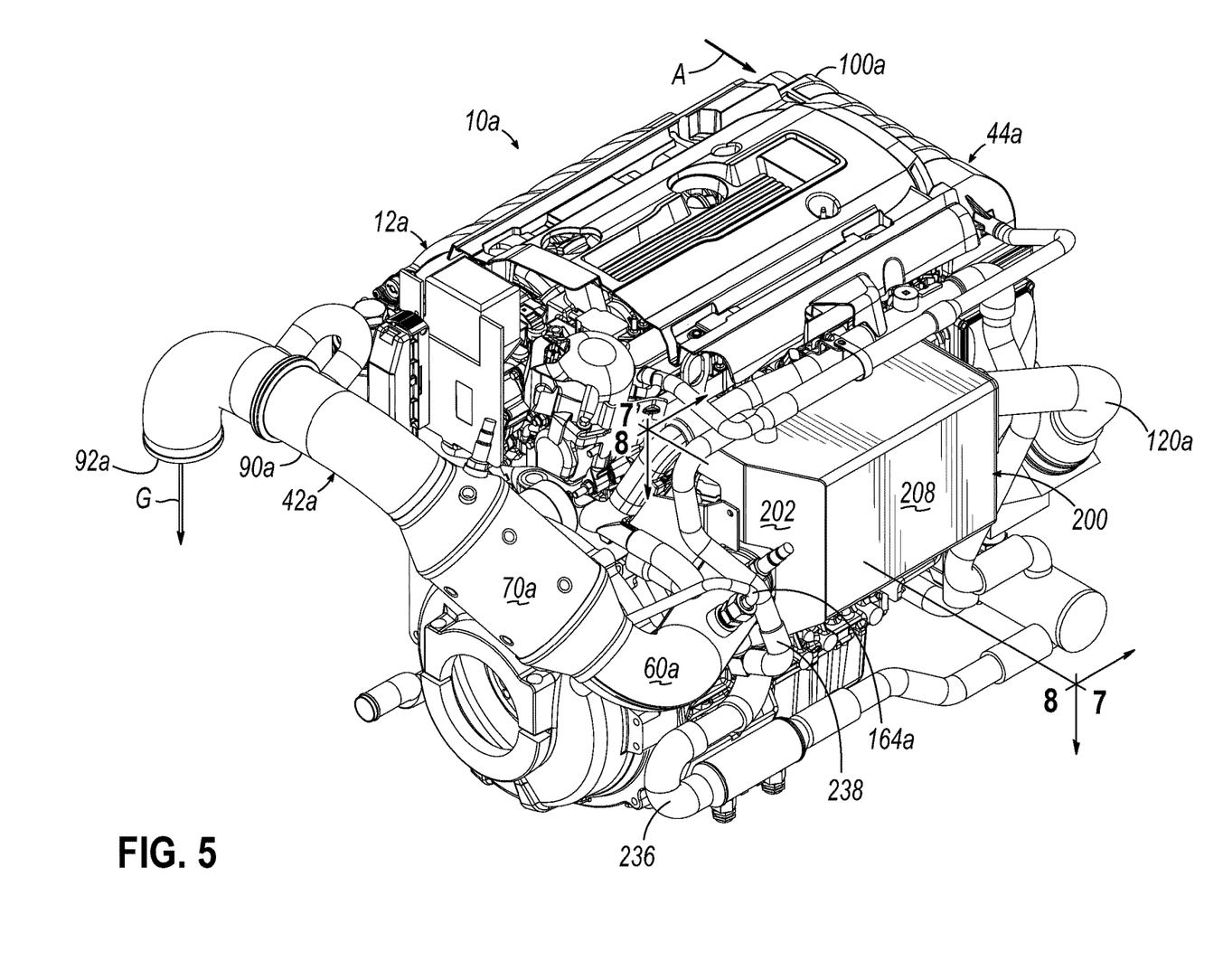
FIG. 5 is a front perspective view of an alternative air intake and exhaust system coupled to an engine, in accordance with another exemplary aspect of the invention.
Figure 6:
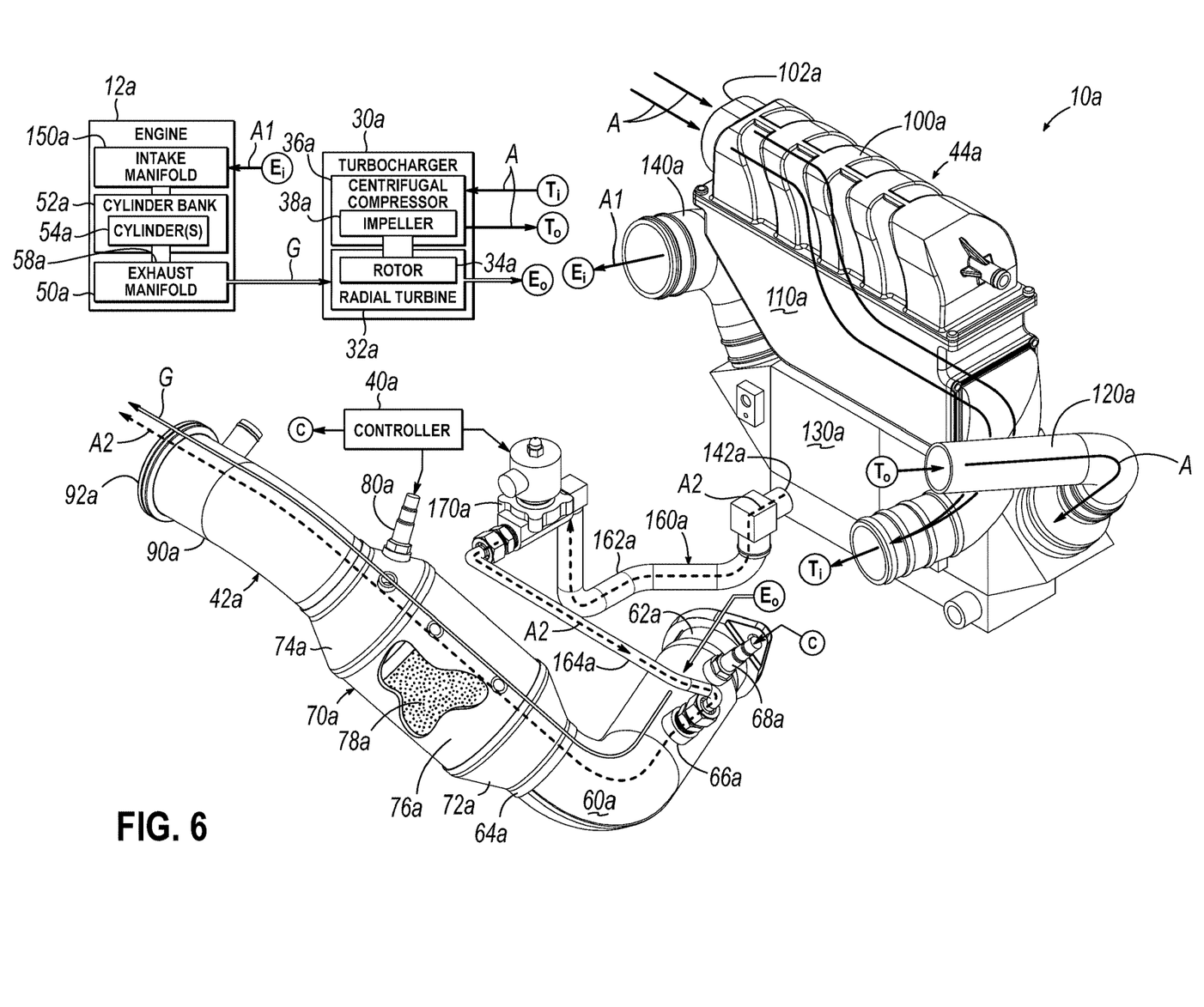
FIG. 6 is a front schematic view of the air intake and exhaust system of FIG. 5 with various components associated with the engine hidden from view, and showing the flow paths of intake air and engine exhaust.

Referring now to FIGS. 5 and 6, wherein like numerals represent like features, an alternative exemplary air intake and exhaust system 10a is shown, with various components associated with the engine 12a being hidden from view in FIG. 6. In the embodiment shown, the air intake and exhaust system 10a includes an exhaust subsystem 42a and an air intake subsystem 44a.

Similar to the exhaust subsystem 42, the exhaust subsystem 42a generally includes at least one exhaust manifold 50a that couples to at least one bank 52a of cylinders 54a of the engine 12a. The at least one exhaust manifold 50 may include a suitable number of exhaust inlet ports 58a, each aligned in fluid communication with and receiving hot exhaust gases G expelled from a respective cylinder 54a of the engine 12a.

The illustrated exhaust subsystem 42a further includes the turbine 32a of the turbocharger 30a. More particularly, the turbine 32a is positioned downstream of and in fluid communication with the exhaust manifold 50a for receiving exhaust gases G expelled therefrom. The rotor 34a of the turbine 32a is operatively coupled to the impeller 38a of the compressor 36a which may be rotatably mounted within the compressor 36a such that rotation of the rotor 34a may cause a corresponding rotation of the impeller 38a. In this manner, the turbine 32a may extract energy from the exhaust gases G and the compressor 36a may transfer the extracted energy to fresh air A within the compressor 36a.

An exhaust conduit 60a is positioned downstream of and in fluid communication with the turbine 32a for receiving exhaust gases G expelled therefrom. The exhaust conduit 60a includes an exhaust inlet 62a positioned proximate to the turbine 32a and an exhaust outlet 64a positioned distal from the turbine 32a. The exhaust conduit 60a also includes a secondary air inlet 66a positioned between the exhaust inlet and outlet 62a, 64a, and a first oxygen sensor 68a positioned between the exhaust inlet 62a and the secondary air inlet 66a such that the first oxygen sensor 68a may be capable of detecting an oxygen level in the exhaust gases G expelled from the turbine 32a.

The first oxygen sensor 68a may be in operative communication with the controller 40a such that the first oxygen sensor 68a may be capable of sending a signal to the controller 40a containing information regarding the detected oxygen level.

A catalytic converter assembly 70a is positioned downstream of and in fluid communication with the exhaust conduit 60a for receiving at least exhaust gases G expelled therefrom. The catalytic converter assembly 70a includes inlet and outlet cone portions 72a, 74a that taper from an intermediate portion 76a having an enlarged diameter for accommodating a catalyst brick or element 78a housed therein. The catalyst element 78a is configured to remove toxic pollutants from the exhaust gases G. A second oxygen sensor 80a is positioned downstream of the catalyst element 78a such that the second oxygen sensor 80a may be capable of detecting an oxygen level in at least the exhaust gases G expelled from the catalyst element 78a.

The second oxygen sensor 80a may be in operative communication with the controller 40a such that the second oxygen sensor 80a may be capable of sending a signal to the controller 40a containing information regarding the detected oxygen level.

The exhaust subsystem 42a also includes a tailpipe 90a positioned downstream of and in fluid communication with the catalytic converter assembly 70a for receiving at least the exhaust gases G expelled therefrom. The tailpipe 90a includes an exhaust subsystem outlet 92a for directing at least the exhaust gases G out of the exhaust subsystem 42a to an external environment.

Similar to the air intake subsystem 44, The air intake subsystem 44a generally includes an air intake 100a having at least one air intake subsystem inlet 102a for receiving fresh ambient air A from the external environment to be primarily directed to the engine 12a for combustion purposes, for example. An air intake duct 110a is positioned downstream of and in fluid communication with the air intake 100a for receiving the fresh ambient air A therefrom.

The illustrated air intake subsystem 44a further includes the compressor 36a of the turbocharger 30a. More particularly, the compressor 36a is positioned downstream of and in fluid communication with the air intake duct 110a for receiving the fresh ambient air A therefrom. The impeller 38a rotatably mounted within the compressor 36a may be configured to compress the air A via rotation of the impeller 38a corresponding to rotation of the rotor 34a of the turbine 32a caused by the exhaust gases G passing through the turbine 32a.

A compressor outlet conduit 120a is positioned downstream of and in fluid communication with the compressor 36a for directing compressed air A therefrom to an intercooler 130a positioned downstream of and in fluid communication with the compressor outlet conduit 120a. An intercooler outlet conduit 140a is positioned downstream of and in fluid communication with the intercooler 130a for directing at least a portion of the compressed air A to an intake manifold 150a of the engine 12a. The interface between the intercooler outlet conduit 140a and the intake manifold 150a may define a primary air injection location into the engine 12a. Thus, the compressor 36a of the turbocharger 30a is fluidly coupled to the intake manifold 150a of the engine 12a for directing at least a first portion of the compressed air A1 to the intake manifold 150a of the engine 12a to provide forced induction to the engine 12a such that the engine 12a may be "boosted."

As shown, the intercooler 130a includes a secondary air outlet 142a, and a secondary air injection conduit 160a extends from the secondary air outlet 142a to the secondary air inlet 66a of the exhaust conduit 60a and bypasses the intercooler outlet conduit 140a and the engine 12a entirely. Thus, while the secondary air outlet 142 of the air intake subsystem 44 is provided in the intercooler outlet conduit 140, the secondary air outlet 142 of the air intake subsystem 44a is provided directly in the intercooler 130a. The illustrated secondary air injection conduit 160a is bifurcated into an upstream portion 162a and a downstream portion 164a by a valve 170a positioned in-line with the secondary air injection conduit 160a. As shown, the upstream portion 162a is in fluid communication with the intercooler 130a via the secondary air outlet 142a and the downstream portion 164a is in fluid communication with the exhaust conduit 60a via the secondary air inlet 66a.

Similar to the valve 170, the valve 170a may have a closed position and at least one open position for selectively placing the upstream and downstream portions 162a, 164a, and thus the intercooler 130a and exhaust conduit 60a, in fluid communication with each other such that a second portion of the compressed air A2 may be directed from the intercooler 130a to the exhaust conduit 60a when the valve 170a is in the open position. In this regard, the discharge pressure of the compressor 36a of the turbocharger 30a may be greater than the backpressure of the exhaust stream G to prevent the exhaust stream G from inadvertently traveling through the secondary air injection conduit 160a. Thus, the secondary air inlet 66a may define a secondary air injection location into the exhaust stream G.

The valve 170a may be in operative communication with the controller 40a such that the valve 170a may be capable of receiving a signal from the controller 40a to move to the at least one open position or to the closed position.

Thus, the compressor 36a of the turbocharger 30a may be selectively fluidly coupled to the catalytic converter assembly 70a for selectively directing a second portion of the compressed air A2 into the exhaust gas stream G at or upstream from the catalytic converter assembly 70a for assisting in catalysis, in a manner similar to that described above with respect to FIGS. 1-4.

Figure 7:
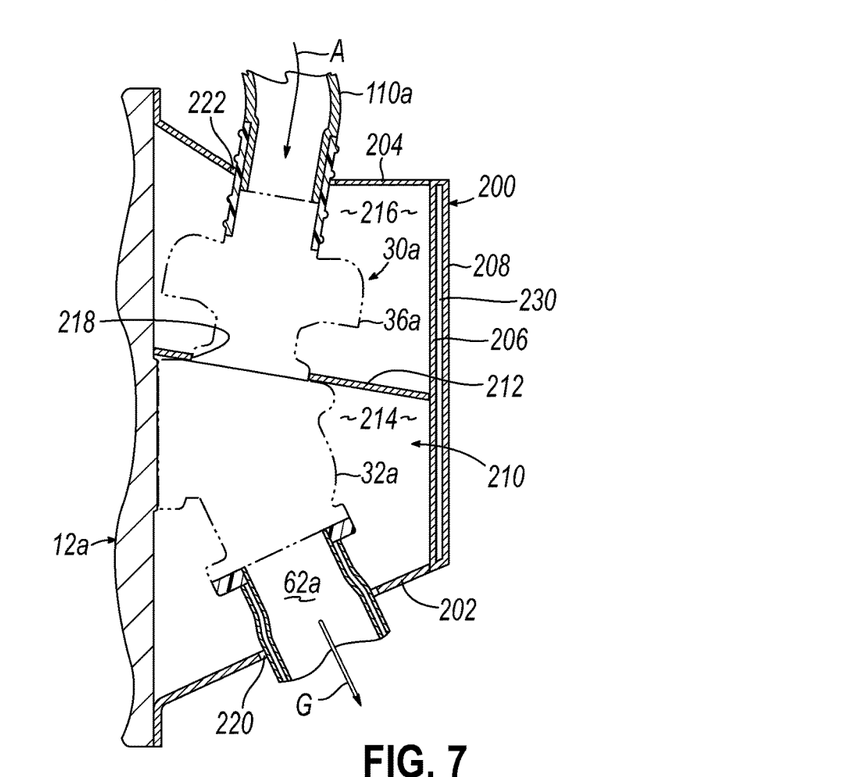
FIG. 7 is a cross sectional view of the heat shield shown in FIG. 5, taken along section line 7-7.
Figure 8:
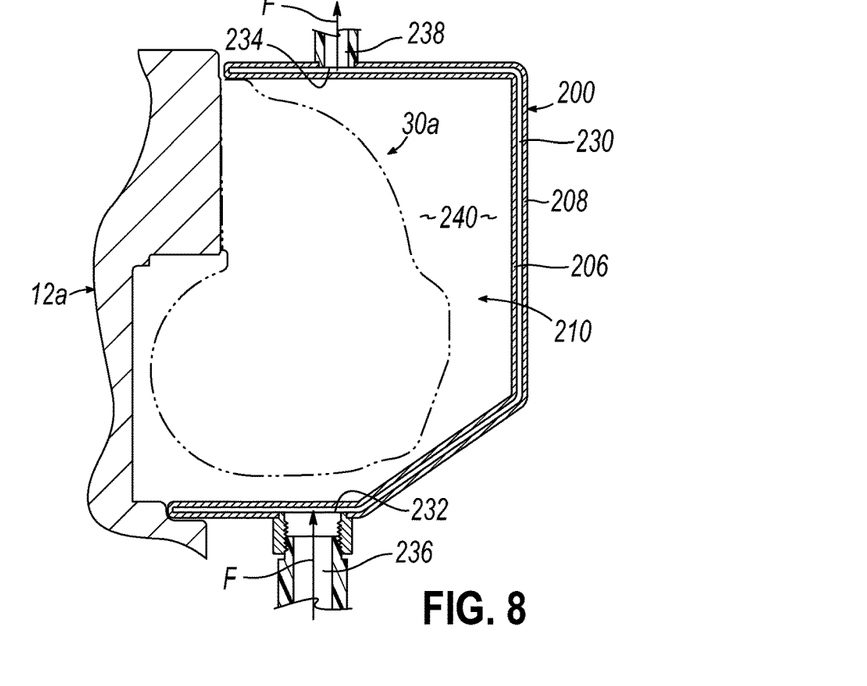
FIG. 8 is a cross sectional view of the heat shield shown in FIG. 5, taken along section line 8-8.

Referring now to FIGS. 7 and 8, with continuing reference to FIGS. 5 and 6, in one embodiment the turbocharger 30a is at least partially enclosed by a heat shield 200. The illustrated heat shield 200 includes first and second sidewalls 202, 204 and inner and outer jackets 206, 208 extending therebetween. The sidewalls 202, 204 and jackets 206, 208 may be constructed of stainless steel, for example, or any other suitable material. The sidewalls 202, 204, inner jacket 206, and a portion of the engine 12a collectively define a main cavity 210 in which the turbocharger 30a is positioned. In the embodiment shown, an inner baffle 212 is positioned within the main cavity 210 between the turbine 32a and the compressor 36a to divide the main cavity 210 into a turbine chamber 214 and a compressor chamber 216. The inner baffle 212 may be constructed of stainless steel or any other suitable material, and may include one or more access holes 218 for allowing various components associated with the turbocharger 30a to extend therethrough between the turbine chamber 214 and the compressor chamber 216. In any event, the inner baffle 212 may assist in thermally isolating the turbine chamber 214 and the compressor chamber 216 from each other. In this regard, the inner baffle 212 may inhibit heat transfer between the turbine chamber 214 and the compressor chamber 216, and thus between the turbine 32a and the compressor 36a of the turbocharger 30a. For example, during normal operation the temperature of the turbine 32a may be approximately 1,800° F. while the temperature of the compressor 36a may be approximately 400° F. A plurality of access holes 220, 222 are provided in the first and second sidewalls 202, 204 for allowing conduits (e.g., the exhaust inlet 62a of the exhaust conduit 60a and the air intake duct 110a, respectively) to extend therethrough into the respective chambers 214, 216, such as for routing fluids (e.g., exhaust gases G and air A) to and/or from the turbine 32a and/or compressor 36a.

As best shown in FIG. 8, the inner and outer jackets 206, 208 are spaced apart from each other to define a fluid passageway 230 which extends at least partially about the turbocharger 30a and is laterally bounded by the sidewalls 202, 204. For example, the illustrated fluid passageway 230 extends from a position below the turbocharger 30a, alongside the turbocharger 30a, to a position above the turbocharger 30a. In this regard, a fluid inlet port 232 is provided in a lower portion of the outer jacket 208 and a fluid outlet port 234 is provided in an upper portion of the outer jacket 208 such that a cooling fluid F may be directed from the fluid inlet port 232, through the fluid passageway 230, to the fluid outlet port 234. Cooling fluid F may be supplied to the fluid inlet port 232 by a cooling fluid inlet conduit 236 and may be discharged from the fluid outlet port 234 into a cooling fluid outlet conduit 238.

By directing the cooling fluid F through the passageway 230 at least partially about the turbocharger 30a, the heat shield 200 may assist in thermally isolating the main cavity 210 from the exterior of the heat shield 200. In this regard, the cooling fluid F may inhibit heat transfer between the main cavity 210 and the outer jacket 208 of the heat shield 200, and thus between the turbocharger 30a and the exterior of the heat shield 200. For example, the surface temperature of the outer jacket 208 may remain at or below 200° F. while the temperature of the turbine 32a may be approximately 1,800° F. and while the temperature of the compressor 36a may be approximately 400° F.

In the embodiment shown, the turbocharger 30a is spaced apart from the inner jacket 206 of the heat shield 200 by an air gap 240. In other words, the turbocharger 30a is not in direct physical contact with the inner jacket 206 of the heat shield 200. The air gap 240 may allow the temperature of the exhaust gases G in the turbine 32a of the turbocharger 30a to be substantially unaffected by the relatively low temperature of cooling fluid F flowing through the passageway 230 so that the temperature of the exhaust gases G may remain relatively high for efficient emissions reduction. For example, the air gap 240 may be between approximately ½ inch and approximately 1 inch.

In one embodiment, the cooling fluid F may be water. For example, the cooling fluid inlet conduit 236 may receive "raw" water drawn from the body of water (e.g., lake or ocean) in which the motorboat 14 is operating via a water pump (not shown). Any other suitable cooling fluid F may be used, such as a synthetic coolant mixture (e.g., glycol), which may be circulated to the fluid passageway 230 through a fluid circuit (not shown). The cooling fluid F may be used for other cooling purposes associated with the engine 12a, such as for cooling the outer surfaces of the exhaust subsystem 42a, before and/or after being directed through the fluid passageway 230 of the heat shield 200. For example, the fluid outlet conduit 238 may direct the cooling fluid F to one or more cooling jackets surrounding the catalytic converter assembly 70a similar to the cooling jackets described in U.S. Pat. No. 9,957,863, the content of which is incorporated by reference in its entirety. The cooling fluid F may flow through such cooling jackets in a direction parallel to the flow of the exhaust gases G, without contacting the exhaust gases G. Ultimately, the cooling fluid F may be combined with the exhaust gases G downstream of the catalytic converter assembly 70a and ejected together with the exhaust gases G through the exhaust subsystem outlet 92a to the environment.

In this manner, the heat shield 200 may effectively thermally isolate the turbocharger 30a from the exterior environment. In one embodiment, the heat shield 200 may allow a conventional automotive turbocharged engine to be marinized without recasting the turbocharger of such an engine with an integral water jacket. In other words, a preexisting automotive turbocharged engine may be easily retrofitted with the heat shield 200 so as to be suitable for use in marine applications.

While the turbine 32, 32a and compressor 36, 36a of the turbocharger 30, 30a have been shown and described as a radial turbine and centrifugal compressor, respectively, it will be appreciated that the turbine 32, 32a and compressor 36, 36a may be configured in any other suitable manner for compressing the air A by extracting energy from the exhaust gases G. For example, the turbine 32, 32a and/or compressor 36, 36a may be axially configured. Moreover, while the illustrated forced induction engine 12, 12a is equipped with the turbocharger 30, 30a including the turbine 32, 32a and the compressor 36, 36a, other suitable forced induction devices may be used. For example, the engine 12, 12a may be equipped with a supercharger having an air compressor driven by a belt connected to a crankshaft (not shown) of the engine 12, 12a, rather than by the illustrated turbine 32, 32a and exhaust stream G. In such cases, a portion of the compressed air A may be directed from the compressor of the supercharger into the exhaust stream G at or upstream of the catalytic converter assembly 70, 70a in a manner similar to that shown and described above. In other embodiments, the engine 12, 12a may be equipped with multiple turbochargers and/or superchargers. For example, the engine 12, 12a may be equipped with a twin turbocharger (e.g., having two turbochargers 30, 30a) or twin supercharger (e.g., having two superchargers). In such cases, two compressors 36, 36a may receive and compress ambient air A which may then be directed to a single intercooler 130, 130a and selectively directed to two separate catalytic converter assemblies 70, 70a, for example.

The physical configurations of the air intake and exhaust system 10, 10a as shown in the accompanying drawings are merely exemplary. The components of the air intake and exhaust systems 10, 10a may be configured and arranged in any suitable manner. For example, the various conduits described herein may extend for any desired length and with any configuration suitable for directing the exhaust gases G and air A to the respective destinations. For example, the tailpipe 90, 90a may extend externally through a transom or a side of the hull of the motorboat 14, and may include an exhaust tip (not shown) of various types known in the art, for example.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A method of injecting secondary air into an exhaust gas stream of a marine engine, the method comprising:
    providing a marine engine having an intake manifold and an exhaust manifold;
    providing a catalytic converter assembly including a catalyst element, the catalytic converter assembly being configured to convert pollutants in an exhaust gas stream received from the exhaust manifold of the marine engine;
    compressing ambient air into compressed air with an air compressor;
    directing at least a first portion of the compressed air to the intake manifold of the marine engine;
    directing a second portion of the compressed air into the exhaust gas stream at a secondary air injection location at or upstream from the catalytic converter assembly;
    detecting an oxygen level of the exhaust gas stream upstream from the secondary air injection location using a first oxygen sensor in operative communication with a controller; and
    detecting an oxygen level of the exhaust gas stream downstream from the catalytic converter assembly using a second oxygen sensor in operative communication with the controller, wherein the controller compares oxygen levels detected by the second oxygen sensor to oxygen levels taken by the first oxygen sensor to determine whether the catalyst element is effectively removing toxic pollutants from the exhaust gas stream.

2. The method of claim 1, further comprising using a turbine to extract energy from the exhaust stream, the turbine being operatively coupled to the air compressor to transfer the extracted energy to the ambient air for compressing the ambient air into the compressed air.

3. The method of claim 1, further comprising using an intercooler fluidly coupled to the air compressor to increase the density of the compressed air.

4. The method of claim 1, further comprising moving a valve positioned between the air compressor and the catalytic converter assembly between at least one open position and a closed position, wherein the second portion of the compressed air flows only when the valve is in the at least one open position.

5. The method of claim 4, wherein the controller is in operative communication with the valve for sending at least one signal to the valve to move the valve to the at least one open position or to the closed position.

6. The method of claim 3 wherein the intercooler has an intercooler outlet conduit in fluid communication with the intake manifold, the intercooler outlet conduit having a secondary air outlet, the secondary air outlet being joined to a secondary air injection conduit, the secondary air injection conduit bypassing the marine engine and terminating in a secondary air inlet of an exhaust conduit.

7. The method of claim 5, wherein the controller sends the at least one signal to the valve in response to the detected oxygen level.

8. The method of claim 1, wherein the at least one open position includes a plurality of open positions.

9. The method of claim 1, wherein a valve determines how much of the compressed air flows to the intake manifold of the marine engine.

10. A method of injecting secondary air into an exhaust gas stream of a marine engine, the method comprising:
    providing a marine engine having an intake manifold and an exhaust manifold;
    providing a catalytic converter assembly positioned in fluid communication with an exhaust conduit, the catalytic converter including a catalyst element and being configured to convert pollutants in an exhaust gas stream received from the exhaust manifold of the engine;
    compressing ambient air into compressed air using an air compressor;
    directing at least a first portion of the compressed air to the intake manifold of the engine from an intercooler fluidly coupled to the air compressor, the intercooler having an intercooler outlet conduit in fluid communication with the intake manifold of the engine;
    directing a second portion of the compressed air to the exhaust conduit wherein the intercooler outlet conduit has a secondary air outlet, the secondary air outlet being joined to a secondary air injection conduit, the secondary air injection conduit bypassing the marine engine and terminating in a secondary air inlet of the exhaust conduit upstream from the catalytic converter assembly;
    detecting an oxygen level of the exhaust gas stream upstream from the secondary air inlet of the exhaust conduit using a first oxygen sensor in operative communication with a controller, and
    detecting an oxygen level of the exhaust gas stream downstream from the catalytic converter assembly using a second oxygen sensor in operative communication with the controller, wherein the controller compares oxygen levels detected by the second oxygen sensor to oxygen levels taken by the first oxygen sensor to determine whether the catalyst element is effectively removing toxic pollutants from the exhaust gas stream.

11. The method of claim 10, further comprising extracting energy from the exhaust stream using a turbine, the turbine being operatively coupled to the air compressor to transfer the extracted energy to the ambient air for compressing the ambient air into the compressed air.

12. The method of claim 10, further comprising moving a valve positioned in-line with the secondary air injection conduit between at least one open position and a closed position, and wherein the air compressor is in fluid communication with the catalytic converter assembly when the valve is in the at least one open position.

13. The method of claim 12, further comprising sending at least one signal to the valve to move to the at least one open position or to the closed position using the controller in operative communication with the valve.

14. The method of claim 13, further comprising a valve positioned in-line with the secondary air injection conduit controlled by the controller.

15. A method of injecting secondary air into an exhaust gas stream of a marine engine, comprising:
   providing an air compressor configured to compress ambient air into compressed air;
   providing a controller in operative communication with a first oxygen sensor located upstream from the secondary air injection location and a second oxygen sensor located downstream from a catalytic converter assembly;
   providing the catalytic converter assembly including a catalyst element, the catalytic converter assembly being configured to convert pollutants in an exhaust gas stream received from the exhaust manifold of the marine engine;
   directing at least a first portion of the compressed air to an intake manifold of the marine engine;
   directing exhaust gases from a turbine past the first oxygen sensor to the catalytic convertor assembly via the exhaust conduit;
   detecting an oxygen level of the exhaust gas stream upstream from the secondary air injection location using the first oxygen sensor in operative communication with the controller;
   directing a second portion of the compressed air via an exhaust conduit into the exhaust gas stream to form a mixture comprising the second portion of the compressed air and the exhaust gas stream;
   directing the mixture through the catalytic converter assembly;
   detecting an oxygen level of the mixture downstream from the catalytic converter assembly using the second oxygen sensor in operative communication with the controller;
   using the controller to compare oxygen levels detected by the second oxygen sensor to oxygen levels taken by the first oxygen sensor to determine whether the catalyst converter assembly is effectively removing toxic pollutants from the exhaust gas stream; and
   directing the mixture to an external environment via a tailpipe.

16. The method of claim 15, wherein compressing ambient air into compressed air includes transferring energy from the exhaust gas stream to the ambient air.

17. The method of claim 15, further comprising:
   directing the first and second portions of the compressed air through an intercooler.

18. The method of claim 15, further comprising:
   detecting an oxygen level in the exhaust gas stream, wherein directing a second portion of the compressed air into the exhaust gas stream is performed in response to the detected oxygen level.

19. The method of claim 15, further comprising:
   using the controller to send one or more signals to a valve to move the valve to a closed position and/or at least one open position in response to one or more signals received from the first and/or second oxygen sensors.

20. The method of claim 19, further comprising moving the valve positioned downstream of the first sensor for directing a second portion of the compressed air into the exhaust gas stream, and wherein the air compressor is in fluid communication with the catalytic converter assembly when the valve is in the at least one open position.

* * * * *